UNITED STATES PATENT OFFICE.

PAUL EUGENE KING, OF TAMPA, FLORIDA.

COATING COMPOSITION.

1,360,226. Specification of Letters Patent. Patented Nov. 23, 1920.

No Drawing. Application filed June 19, 1920. Serial No. 390,134.

*To all whom it may concern:*

Be it known that I, PAUL EUGENE KING, a citizen of the United States, residing at Tampa, in the county of Hillsboro and State of Florida, have invented certain new and useful Improvements in Coating Composition, of which the following is a specification.

My said invention consists in an improved composition for coating galvanized iron for the purpose of preserving the same, and which will not crack or peel or fleck off, being of great durability and service.

Said composition is made by compounding red lead, oxid of iron, powdered litharge, raw linseed oil, turpentine, kerosene and japan drier, in proportions and by a method as follows:

For example, I take fifty (50) pounds of red lead, fifty (50) pounds of princess metallic (oxid of iron), twenty (20) ounces of powdered litharge, four (4) gallons of raw linseed oil, one (1) gallon of turpentine, one (1) gallon of kerosene, and one-half (1/2) galon of japan drier.

Said ingredients are prepared and mixed as follows: The red lead and oxid of iron are mixed to a stiff paste with the linseed oil, turpentine and kerosene. The litharge is mixed with turpentine to about the consistency of cream; it is then added to the paste; the mixture is then thinned with the remaining oils; then the japan drier is stirred in and the compound thoroughly mixed and allowed to stand for a period of, say, twenty-four (24) hours. The composition is then ready for use.

This composition can be applied directly to the surface of galvanized iron without any preliminary preparation, such as a vinegar or lime water wash before application, it not being affected by acids, ammonia or fumes of any nature. It is designed to and does thoroughly destroy all acids, ammonia and fumes and gases which cause ordinary paints to scale or corrode on galvanized iron. It is also a thorough rust destroyer on structural or sheet steel and black iron, such as caused by salt atmosphere or salt water.

Having thus fully described my said invention, what I claim as new and desire to secure by Letters Patent, is:

1. A composition for coating iron, comprising red lead, oxid of iron, powdered litharge, linseed oil, turpentine, kerosene and japan drier, compounded in substantially the proportions and manner herein described.

2. A composition for coating iron comprising the ingredients and in the proportions as follows: 50 pounds red lead, 50 pounds oxid of iron, 20 ounces powdered litharge, 4 gallons raw linseed-oil, 1 gallon turpentine, 1 gallon kerosene, 1/2 gallon japan drier, prepared and mixed substantially as herein described.

In witness whereof, I have hereunto set my hand and seal at Tampa, Florida, this 14th day of June, A. D. nineteen hundred and twenty.

PAUL EUGENE KING. [L. S.]

Witnesses:
L. A. McGEOCHER,
J. A. STRICKLAND.